United States Patent Office 3,466,168
Patented Sept. 9, 1969

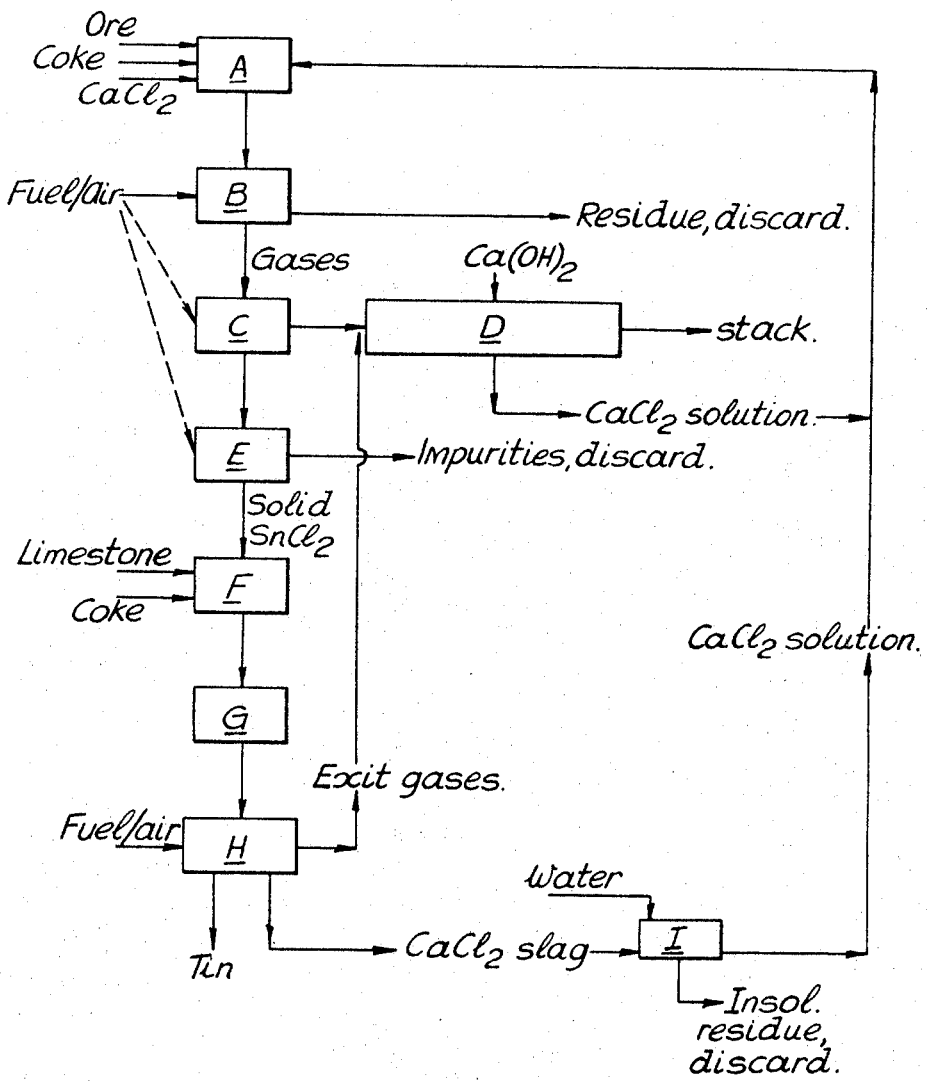

3,466,168
METHOD OF SMELTING TIN ORES
Archibald William Fletcher, Stevenage, and John Charles Wilson, Hitchin, England, assignors to National Research Development Corporation, London, England, a British corporation
Filed Jan. 3, 1966, Ser. No. 518,265
Claims priority, application Great Britain, Jan. 11, 1965, 1,262/65
Int. Cl. C22b *25/02, 1/24*
U.S. Cl. 75—85     5 Claims

ABSTRACT OF THE DISCLOSURE

A method of extracting tin from ores and concentrates is described characterized in that the tin content of the ores is extracted as stannous chloride by mixing the ores with carbon and an inorganic chloride, roasting the mixture at a temperature above the boiling point of stannous chloride and condensing the stannous chloride vapor given off and reducing the stannous chloride by heating at elevated temperatures with carbon and calcium carbonate or calcium oxide. In a preferred embodiment the stannous chloride is ground with coke and lime or limestone, the ground mixture pelletized or briquetted and the resultant pellets or briquettes heated at a temperature sufficient to reduce the stannous chloride to metallic tin and to maintain the metallic tin and calcium chloride formed in the liquid state, permitting the tin which has a higher density to separate from the calcium chloride slag.

---

The invention relates to a new method of extracting tin from low grade tin ores.

According to the invention a method of smelting tin ores comprises the steps of extracting the tin content of the ore as stannous chloride and reducing the stannous chloride to metallic tin by heating at elevated temperatures with carbon and calcium carbonate or oxide.

In the prefered form of the invention, the method comprises the steps of extracting the tin content of the or coke and limestone, pelletizing or briquetting the with coke and lime or limestone, pelletising the mixture, heating the pellets to a temperature sufficient to secure the reduction of the stannous chloride and maintain the metallic tin and calcium chloride formed in the liquid state, thus allowing the tin, which has a higher density to separate from the calcium chloride slag.

According to a further feature of the invention, the tin content of the ores is extracted as stannous chloride by mixing the ores with carbon and an inorganic chloride, roasting the mixture at a temperature above the boiling point of stannous chloride and condensing the stannous chloride vapour given off. The inorganic chloride is preferably calcium chloride.

A process exemplifying the method of the invention is described below with reference to the accompanying drawing, which is a flow sheet of the process.

Low grade tin ores, which may consist of slimes, are mixed with calcium chloride and coke in a mixer A. The mixture is preferably dried and pelletised and is then roasted at a temperature of 700–900° C. in a controlled reducing atmosphere in a roaster B. The vapours given off are led to a condenser c whilst the gangue left at the end of the roasting process is discarded or stockpiled for the recovery of other metal values, e.g. there may be present non-volatile chlorides of other metals which can be recovered by leaching. The vapour includes stannous chloride and other volatile chlorides of metals present in the ore, and thus it is advantageous that the condenser be operated at such a temperature that condensation of the stannous chloride occurs whilst volatile chlorides and other compounds of lower boiling point are not condensed. These volatile compounds may be passed to a calcium hydroxide scrubber D in which any metals are precipitated as oxides or hydroxides whilst the chlorine content of the chlorides is recovered as calcium chloride, the remaining gases being passed to a flue.

The volatisation reaction may be represented by the following equation which is used in the stoichiometric calculations referred to later.

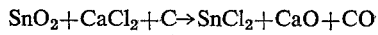

$$SnO_2 + CaCl_2 + C \rightarrow SnCl_2 + CaO + CO$$

In order to ensure maximum efficiency of the above reaction it is desirable that the ore should contain silica or another acidic or amphoteric oxide in sufficient quantity to react with the lime formed, e.g. in the presence of silica, which is commonly a constituent of low-grade tin concentrates, the following reaction will occur

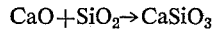

$$CaO + SiO_2 \rightarrow CaSiO_3$$

Certain metals other than tin present in the ore are also likely to react to form volatile chlorides during roasting but it should be possible to select conditions which favour the volatilisation of tin and not of the other metals. Thus the formation of volatile chlorides of copper is inhibited by reducing conditions and requires higher temperatures than those necessary for stannous chloride volatilisation. A large part of the arsenic present in the ore is volatilised during roasting and tends to deposit in the solid metallic form at a lower temperature than the stannous chloride which can be removed from the condenser as a liquid. Only trace amounts of iron chlorides are formed during roasting. The melting and boiling points of the more important compounds likely to be found or formed in the ore mixture fed to the roaster are listed in Table 1 below.

TABLE 1.—MELTING AND BOILING POINTS

| Compound | M. Pt., °C. | B. Pt., °C. |
|---|---|---|
| $CaCl_2$ | 772 | 1,600 |
| $SnCl_2$ | 246 | 623 |
| $ZnCl_2$ | 262 | 732 |
| $PbCl_2$ | 501 | 950 |
| $Cu_2Cl_2$ | 422 | 1,366 |
| $FeCl_2$ | 670 | (1) |
| $FeCl_3$ | 282 | 315 |
| Tin | 232 | 2,270 |
| Zinc | 419 | 907 |
| Lead | 327 | 1,613 |
| Copper | 1,083 | 2,310 |
| Iron | 1,535 | 3,000 |

[1] Sublimes.

The stannous chloride recovered from the condenser may be passed to purifier E, where it may be separated from impurities by liquation, fractional distillation or other means. After cooling, the solid stannous chloride is ground with limestone and coke or charcoal in a grinder F. The comminuted mixture is then briquetted or pelletised in a pelletiser G and the pellets fed into an inclined rotary furnace H or like apparatus. The furnace may be gas or oil fired to maintain a temperature of approximately 1000° C. As the pellets move along the furnace, the stannous chloride, lime and carbon react, probably according to the following formula

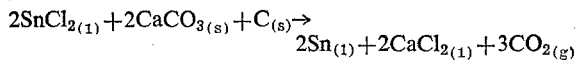

$$2SnCl_{2(l)} + 2CaCO_{3(s)} + C_{(s)} \rightarrow 2Sn_{(l)} + 2CaCl_{2(l)} + 3CO_{2(g)}$$

where the subscripts *l*, *s* and *g* refer to liquid, solid and gaseous phases respectively. The molten tin and molten calcium chloride slag can then be tapped separately from the furnace. The gases from the furnace are passed to the scrubber D. It may be advantageous to purify the metallic tin by conventional means such as liquation or electrorefining.

In an alternative arrangement, the hot charge leaves the rotary furnace at above 800° C. and is transferred to a separate melting furnace for the separation process.

The calcium chloride is leached from the slag in chamber I purified and recirculated, together with the calcium chloride recovered from the scrubber D to the mixer A. Alternatively, the calcium chloride slag may simply be crushed and ground after cooling and the ground product recycled direct to the mixer A. It may be found preferable to use liquor from the scrubber for leaching the cooled slag.

The following examples are illustrative of the method of the invention.

Example 1

This example illustrates the recovery of stannous chloride from various tin slimes or concentrates by roasting with calcium chloride in the presence of carbon.

The dry slimes or concentrates were mixed with carbon and calcium chloride solution to form a stiff paste which was dried and granulated. The granules were heated in a silica tube through which gas was passed, and the gases leaving the tube were passed through a water bubbler. Most of the volatilised tin chloride condensed on the cooler parts of the tube with only a small amount passing through to the bubbler. The percentage of tin volatilised was determined by assaying the roasted residue and the recoveries of tin were determined by analysing the solution of the products. The results are given in Table II.

TABLE II (a) Chloride roasting of tin slimes enriched with cassiterite concentrate

| Head Assay, percent Sn | C added, percent | $CaCl_2$, added, percent | Time, Hours | Temp., °C. | Air flow, Cu. ft./ 50 g. | Sn volatilised, percent | Recovery of volatilised Sn, percent |
|---|---|---|---|---|---|---|---|
| 7.34 | 4.0 | 10.0 | 1 | 740 | 0.19 | 82.6 | 83.6 |
| 7.34 | 4.0 | 10.0 | 1 | 840 | 0.09 | 80.7 | 91.5 |

(b) Chloride roasting of tin slime flotation concentrates

| 3.00 | 4.0 | 5.0 | 1 | 720 | 0.40 | 87.0 | 100.0 |
| 4.80 | 5.0 | 7.5 | 1 | 820 | 0.23 | 90.4 | 92.4 |

(c) Chloride roasting of table concentrates of tin deposits

| Head Assay, percent Sn | C added, percent | $CaCl^2$, added, percent | Time, Hours | Temp., °C. | Air flow, ml./gm./ min. | Sn volatilised, percent | Recovery of volatised Sn, percent |
|---|---|---|---|---|---|---|---|
| 3.6 | 2.0 | 6.0 | 2 | 800 | 1.0 | 91.6 | 87.8 |
| 3.1 | 4.2 | 6.35 | 1 | 800 | 1.2 | 88.7 | 87.0 |

(d) Chloride roasting of cornish tin ore

| Head Assay, percent Sn | C added, percent | $CaCl_2$, added, percent | Time, Hours | Temp., °C. | Nitrogen flow, ml./ kg./min. | Sn volatilised, percent | Recovery of volatised Sn, percent |
|---|---|---|---|---|---|---|---|
| 10.7 | 1.9 | 16.4 | 1 | 800 | 2.5 | 70.3 | 93.9 |

In Table II the time column indicates the time for which the charge was maintained at the specified temperature. The percentage of carbon and the percentage of calcium chloride are by weight of the ore. The percentage of tin volatilized is based on the total weight of the tin in the ore, whereas the percentage of tin recovered is based on the weight of the tin volatilized. The air flow is measured in cubic feet per 50 grams of charge.

The presence of sulphides in the slimes or concentrates will inhibit chloridisation but the sulphides may be removed by preliminary oxidation roasting.

With high air flows, losses are incurred probably due to the formation of aerosols.

Similar continuously operated tests were also carried out. In the first case, feed material containing 6.25% tin and mixed with 200% of the stoichiometric requirements of $CaCl_2$ and carbon gave in a nitro atmosphere a residue assaying 0.33% tin, and 95.8 volatilization of the tin.

The same test repeated in a producer gas atmosphere gave a residue assaying 0.22% tin with 97.2% volatilization of the tin.

Example 2

This example relates to the reduction of the stannous chloride.

60 parts of pure anhydrous stannous chloride were mixed with 35 parts calcium carbonate and 5 parts of carbon and the mixture heated in a crucible with a lid in an electrically heated furnace for varying periods. The mixture gave the stoichiometric amount of calcium carbonate and twice the stoichiometric amount of carbon for the equation:

$$2SnCl_2 + 2CaCO_3 + C = 2Sn + 2CaCl_2 + 3CO_2$$

On cooling the crucible was found to contain droplets of tin metal suspended in the chloride slag and a button of tin metal at the bottom. Typical results for tin metal recovery are given in Table III below:

TABLE III.—TIN METAL RECOVERY FROM STANNOUS CHLORIDE

| Smelting temperature, °C. | Time at temperature, mins. | Tin recovery as metallic tin, percent |
|---|---|---|
| 1,000 | 60 | 93 |
| 1,000 | 60 | 90.5 |
| 1,000 | 15 | 90.5 |
| 1,000 | 10 | 88.4 |
| 1,000 | 5 | 38 |
| 800 | 30 | 77 |

Equally good tin recoveries were obtained when lime (CaO) was used in the place of calcium carbonate ($CaCO_3$) in the mixture for smelting. In this case the reaction would proceed according to the equation:

$$2SnCl_2 + 2CaO + C = 2Sn + 2CaCl_2 + CO_2$$

The use of hydrated stannous chloride ($SnCl_2 2H_2O$) in the mixture for smelting was investigated and it was found that the presence of the water did not appear to affect tin recoveries. Not more than 10% of tin may be lost during smelting as a stannous chloride fume but this can be recovered in gas exit ducts and, if necessary, by the use of an electrostatic precipitator or wet scrubber. In all tests chloride recovery (as $CaCl_2$) exceeded 90 percent and the grade of tin metal produced was 99.6% pure. It was found that the rate of heating during smelting is not critical, but there may be some advantage to be gained by rapid heating to the smelting temperature (1000° C.) to reduce the loss of stannous chloride as a fume.

Tests have shown that it is possible to obtain minimum tin recovery of 90% in the 3 important unit processes roasting, condensation, smelting, giving an overall recovery of 72.9% ($90 \times 90 \times 90 / 10^4$). This recovery figure is likely to be exceeded in properly designed full scale plant.

We claim:

1. A method of extracting tin from ores and concentrates characterized in that the tin content of the ores is extracted as stannous chloride by mixing the ores with carbon and an inorganic chloride, roasting the mixture at a temperature above the boiling point of stannous chloride and condensing the stannous chloride vapor given off, grinding the stannous chloride with coke and lime or coke and limestone, pelletizing or briquetting the ground mixture, and heating the resulting pellets or briquettes to a temperature sufficient to secure the reduction of the stannous chloride to metallic tin and to maintain the metallic tin and calcium chloride formed in the liquid state, thus allowing the tin, which has a higher density, to separate from the calcium chloride slag.

2. The method of claim 1, characterised in that the inorganic chloride is calcium chloride.

3. The method of claim 2, characterised in that the calcium chloride formed during reduction of the stannous chloride is recycled to provide at least part of the inorganic chloride that is required to extract the tin content of the ore as stannous chloride.

4. The method of claim 1, characterised in that reduction of the stannous chloride is effected in a rotary furnace maintained at approximately 1000° C.

5. The method of claim 4 characterized in that the charge is allowed to cool and leaves the furnace after cooling to approximately 800° C. and is transferred to a separate melting furnace in which the molten tin and calcium chloride slag formed are allowed to separate.

References Cited

UNITED STATES PATENTS

| | | | |
|---|---|---|---|
| 1,518,375 | 12/1924 | Vermaes et al. | 75—113 |
| 1,518,376 | 12/1924 | Vermaes et al. | 75—113 |
| 1,817,865 | 8/1931 | Ashcroft | 75—85 X |
| 1,931,944 | 10/1933 | Wood et al. | 75—113 X |
| 2,011,533 | 8/1935 | Wood | 75—113 |

L. DEWAYNE RUTLEDGE, Primary Examiner

H. W. TARRING II, Assistant Examiner

U.S. Cl. X.R.

23—98; 75—113